(12) United States Patent
Shi et al.

(10) Patent No.: US 10,419,939 B2
(45) Date of Patent: Sep. 17, 2019

(54) RESOURCE PARTITION AGGREGATING METHOD AND DEVICE

(71) Applicant: YULONG COMPUTER TELECOMMUNICATIONS SCIENTIFIC (SHENZHEN) CO., LTD., Shenzhen (CN)

(72) Inventors: Zhen-Wei Shi, Shenzhen (CN); Ming Jiang, Shenzhen (CN); Jian-Hui Li, Shenzhen (CN); Kuan Wu, Shenzhen (CN); Rong Chen, Shenzhen (CN); Yi-Xue Lei, Shenzhen (CN); Qian Zheng, Shenzhen (CN); Yun-Fei Zhang, Shenzhen (CN)

(73) Assignee: YULONG COMPUTER TELECOMMUNICATIONS SCIENTIFIC (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/329,113

(22) PCT Filed: Dec. 28, 2016

(86) PCT No.: PCT/CN2016/112733
§ 371 (c)(1),
(2) Date: Feb. 27, 2019

(87) PCT Pub. No.: WO2018/049757
PCT Pub. Date: Mar. 22, 2018

(65) Prior Publication Data
US 2019/0230514 A1 Jul. 25, 2019

(30) Foreign Application Priority Data

Sep. 14, 2016 (CN) .......................... 2016 1 0824371

(51) Int. Cl.
*H04W 16/10* (2009.01)
*H04W 16/02* (2009.01)
(Continued)

(52) U.S. Cl.
CPC .......... *H04W 16/10* (2013.01); *G06F 9/5061* (2013.01); *H04L 9/0643* (2013.01); *H04W 4/40* (2018.02); *G06F 2209/5011* (2013.01)

(58) Field of Classification Search
CPC ..... H04W 16/18; H04W 16/10; H04W 14/14; H04W 72/04; H04W 16/04; H04W 24/02;
(Continued)

(56) References Cited

U.S. PATENT DOCUMENTS

| 2009/0054029 | A1  | 2/2009  | Hogberg et al. |
| 2011/0268070 | A1* | 11/2011 | Guan ............... H04L 5/0007 370/329 |
| 2014/0323153 | A1* | 10/2014 | Xiao ............... H04W 4/027 455/456.2 |
| 2017/0064722 | A1* | 3/2017  | Tarlazzi ................ H04B 17/12 |
| 2017/0289964 | A1* | 10/2017 | Lin ........................ H04L 5/0094 |
| 2018/0020432 | A1* | 1/2018  | Rico Alvarino ........ H04W 8/22 |
| 2018/0035406 | A1* | 2/2018  | Hao ...................... H04L 5/0007 |

(Continued)

FOREIGN PATENT DOCUMENTS

| CN | 1926898 A | 3/2007 |
| CN | 101394647 A | 3/2009 |

(Continued)

*Primary Examiner* — Khawar Iqbal
(74) *Attorney, Agent, or Firm* — ScienBiziP, P.C.

(57) ABSTRACT

An embodiment of the disclosure provides a resource partition aggregating method and a device, the method includes acquiring a resource utilization ratio of each resource partition in a first signal unit. When there is a resource utilization ratio of each resource partition of at least two adjacent resource partitions in the first signal unit is less than a first preset threshold, whether a zone index used after aggregat- (Continued)

ing the at least two adjacent resource partitions causes a communication interference with zone indexes used by resource partitions in an adjacent second signal unit is determined. If no communication interference is caused, determining area distribution parameters of the aggregated at least two adjacent resource partitions. A broadcast message carrying the area distribution parameters to a vehicle terminal is sent. By using the embodiment of the present disclosure, a resource utilization ratio can be improved.

20 Claims, 11 Drawing Sheets

(51) Int. Cl.
*H04L 9/06* (2006.01)
*H04W 4/40* (2018.01)
*G06F 9/50* (2006.01)

(58) Field of Classification Search
CPC ...... H04W 16/26; H04L 29/08; H04L 9/0643; G06F 9/5061; G06F 2209/5011
See application file for complete search history.

(56) References Cited

U.S. PATENT DOCUMENTS

| | | | |
|---|---|---|---|
| 2018/0063749 A1* | 3/2018 | Islam | H04B 7/2656 |
| 2018/0097554 A1* | 4/2018 | Guey | H04L 27/2607 |
| 2018/0152269 A1* | 5/2018 | Xiong | H04W 72/048 |
| 2019/0098636 A1* | 3/2019 | Zhao | H04J 11/0026 |
| 2019/0103951 A1* | 4/2019 | Park | H04W 72/12 |
| 2019/0150132 A1* | 5/2019 | Bala | H04L 1/1893 |
| 2019/0166533 A1* | 5/2019 | Li | H04W 4/40 |

FOREIGN PATENT DOCUMENTS

| | | |
|---|---|---|
| CN | 102685900 A | 9/2012 |
| CN | 105246025 A | 1/2016 |
| CN | 105338539 A | 2/2016 |

* cited by examiner

RESOURCE PARTITION AGGREGATING METHOD AND DEVICE

CROSS-REFERENCE TO RELATED APPLICATIONS

This application claims priority of Chinese Patent Application No. 201610824371.0, entitled "resource partition aggregating method and device" filed on Sep. 14, 2016 in the China National Intellectual Property Administration (CNIPA), the entire contents of which are incorporated by reference herein.

FIELD

The present disclosure relates to a technical field of electronic, specifically a resource partition aggregating method and a device.

BACKGROUND

Zone resource partition is a concept proposed by Third Generation Partnership Project (3GPP) for Vehicle-to-everything (V2X, a communication from a vehicle terminal to another terminal) based on a Device-to-Device (D2D) protocol. Traffic space will be divided into geographical zone, vehicle user equipment (VUE) determines a zone where the VUE is located through simulation operations, and knows which resource pool can be used.

In a solution, as shown in FIG. 1, FIG. 1 shows a schematic structural diagram of a resource partition in a signal unit cell according to the solution. A zone is divided into grids. A size of the zone is defined by an evolved Node B (eNB). A reference point (0, 0) is fixed. The zone in the signal unit cell is marked by a zone index, such as: $(z_x, z_y)$. One or more resource pools correspond to one zone index. On the VUE side, a hash function can be pre-configured to convert a geographic location (x, y) acquired by a Global Positioning System (GPS) into the zone index. The hash function is represented as follows: $Z_x = \mod((x-x_0)/L, \text{Max}\_Z_x)$, $Z_y = \mod((y-y_0)/W, \text{Max}\_Z_y)$, in which, $(x_0, y_0)$ is the reference point, (L, W) is the size of the zone, $(\text{Max}\_Z_x, \text{Max}\_Z_y)$ is a maximum value of the zone index in the cell. However, since one zone in the cell can be using one resource pool, zone resources with large traffic volume are strained and zone resources with small traffic volume are wasted. Resource pool allocation and resource pool requirements are not fully utilized, and a resource utilization ratio is low.

SUMMARY

Embodiments of the present disclosure provide a resource partition aggregating method and a device, the technical problem of low resource utilization in the current solution can be solved.

According to a first embodiment of the present disclosure, a resource partition aggregating method is provided, the method includes:

Acquiring a resource utilization ratio of each resource partition in a first signal unit;

Determining whether there is a resource utilization ratio of each resource partition of at least two adjacent resource partitions in the first signal unit is less than a first preset threshold;

When there is a resource utilization ratio of each resource partition of at least two adjacent resource partitions in the first signal unit is less than a first preset threshold, determining whether a zone index used after aggregating the at least two adjacent resource partitions causes a communication interference with zone indexes used by resource partitions in an adjacent second signal unit;

If no communication interference is caused, determining area distribution parameters of the aggregated at least two adjacent resource partitions;

Sending a broadcast message carrying the area distribution parameters to a vehicle terminal, the broadcast message being used to instruct the vehicle terminal to determine a zone index of a resource partition in which the vehicle terminal is located and to use a resource pool corresponding to the zone index, according to the area distribution parameters and a pre-acquired geographic location.

Optionally, before determining the area distribution parameters of the aggregated at least two adjacent resource partitions, the method further includes:

Determining whether a resource utilization ratio of a new resource partition acquired by aggregating the at least two adjacent resource partitions is greater than a second preset threshold;

When the resource utilization ratio of the new resource partition is not greater than the second preset threshold, the step of determining the area distribution parameters of the aggregated at least two adjacent resource partitions is executed.

Optionally, determining whether a zone index used after aggregating the at least two adjacent resource partitions causes a communication interference with zone indexes used by resource partitions in an adjacent second signal unit includes:

Determining whether each resource partition of the at least two resource partitions is close to a boundary between the first signal unit and the second signal unit;

When each resource partition of the at least two resource partitions is not close to the boundary, determining that the zone index used after aggregating the at least two adjacent resource partitions does not cause any communication interference with the zone indexes used by the resource partitions in the second signal unit.

Optionally, determining whether a zone index used after aggregating the at least two adjacent resource partitions causes a communication interference with zone indexes used by resource partitions in an adjacent second signal unit includes:

Determining whether each resource partition of the at least two resource partitions is close to a boundary between the first signal unit and the second signal unit;

When each resource partition of the at least two resource partitions is close to the boundary, sending the zone index of each resource partition of the at least two adjacent resource partitions to a base station that the second signal unit belongs to, to enable the base station to determine whether zone indexes used by the resource partitions close to the boundary in the second signal unit are the same as the zone index of each resource partition of the at least two adjacent resource partitions, and return aggregation indication information;

According to the aggregation indication information, determining whether a zone index used after aggregating the at least two adjacent resource partitions causes a communication interference with zone indexes used by resource partitions in an adjacent second signal unit.

Optionally, the zone index is the same as a zone index used by a target resource partition of the at least two adjacent resource partitions;

According to the aggregation indication information, determining whether a zone index used after aggregating the at least two adjacent resource partitions causes a communication interference with zone indexes used by resource partitions in an adjacent second signal unit includes:

Removing the zone index used by the target resource partition of the at least two adjacent resource partitions, to determine that the zone index used after aggregating the at least two adjacent resource partitions does not cause any communication interference with the zone indexes used by the resource partitions in the second signal unit.

Optionally, the aggregation indication information includes the resource partitions close to the boundary in the second signal unit not being aggregated;

According to the aggregation indication information, determining whether a zone index used after aggregating the at least two adjacent resource partitions causes a communication interference with zone indexes used by resource partitions in an adjacent second signal unit includes:

When the resource partitions close to the boundary in the second signal unit are not aggregated, determining that the zone index used after aggregating the at least two adjacent resource partitions does not cause any communication interference with the zone indexes used by the resource partitions in the second signal unit.

Optionally, the aggregation indication information includes the zone index used by the new resource partition acquired by aggregating the resource partitions close to the boundary in the second signal unit being different from the zone index used by each resource partition of the at least two adjacent resource partitions;

According to the aggregation indication information, determining whether a zone index used after aggregating the at least two adjacent resource partitions causes a communication interference with zone indexes used by resource partitions in an adjacent second signal unit includes:

When the zone index used by the new resource partition acquired by aggregating resource partitions close to the boundary in the second signal unit is different from the zone index used by each resource partition of the at least two adjacent resource partitions, determining that the zone index used after aggregating the at least two adjacent resource partitions does not cause any communication interference with the zone indexes used by the resource partitions in the second signal unit.

According to a second embodiment of the present disclosure, a resource partition aggregating device is provided, the device includes:

An information acquisition module, configured to acquire a resource utilization ratio of each resource partition in a first signal unit;

A resource determination module, configured to determine whether there is a resource utilization ratio of each resource partition of at least two adjacent resource partitions in the first signal unit is less than a first preset threshold;

When there is a resource utilization ratio of each resource partition of at least two adjacent resource partitions in the first signal unit is less than a first preset threshold, an interference determination module configured to, determine whether a zone index used after aggregating the at least two adjacent resource partitions causes a communication interference with zone indexes used by resource partitions in an adjacent second signal unit;

If no communication interference is caused, a parameter determination module configured to, determine area distribution parameters of the aggregated at least two adjacent resource partitions;

A message sending module, configured to, send a broadcast message carrying the area distribution parameters to a vehicle terminal, the broadcast message being used to instruct the vehicle terminal to determine a zone index of a resource partition in which the vehicle terminal is located and to use a resource pool corresponding to the zone index, according to the area distribution parameters and a pre-acquired geographic location.

Optionally, the parameter determination module, also configured to, determine whether a resource utilization ratio of a new resource partition acquired by aggregating the at least two adjacent resource partitions is greater than a second preset threshold; when the resource utilization ratio of the new resource partition is not greater than the second preset threshold, the step of determining the area distribution parameters of the aggregated at least two adjacent resource partitions is executed.

Optionally, the interference determination module, specifically configured to:

Determine whether each resource partition of the at least two resource partitions is close to a boundary between the first signal unit and the second signal unit;

When each resource partition of the at least two resource partitions is not close to the boundary, determine that the zone index used after aggregating the at least two adjacent resource partitions does not cause any communication interference with the zone indexes used by the resource partitions in the second signal unit.

Optionally, the interference determination module, specifically configured to:

Determine whether each resource partition of the at least two resource partitions is close to a boundary between the first signal unit and the second signal unit;

When each resource partition of the at least two resource partitions is close to the boundary, send the zone index of each resource partition of the at least two adjacent resource partitions to a base station that the second signal unit belongs to, to enable the base station to determine whether zone indexes used by the resource partitions close to the boundary in the second signal unit are the same as the zone index of each resource partition of the at least two adjacent resource partitions, and return aggregation indication information;

According to the aggregation indication information, determine whether a zone index used after aggregating the at least two adjacent resource partitions causes a communication interference with zone indexes used by resource partitions in an adjacent second signal unit.

Optionally, the aggregation indication information includes a zone index used by a new resource partition acquired by aggregating the resource partitions close to the boundary in the second signal unit is the same as a zone index used by a target resource partition of the at least two adjacent resource partitions;

The interference determination module, specifically configured to:

Remove the zone index used by the target resource partition of the at least two adjacent resource partitions, to determine that the zone index used after aggregating the at least two adjacent resource partitions does not cause any communication interference with the zone indexes used by the resource partitions in the second signal unit.

Optionally, the aggregation indication information includes the resource partitions close to the boundary in the second signal unit not being aggregated;

The interference determination module, specifically configured to:

When the resource partitions close to the boundary in the second signal unit are not aggregated, determine that the zone index used after aggregating the at least two adjacent resource partitions does not cause any communication interference with the zone indexes used by the resource partitions in the second signal unit.

Optionally, the aggregation indication information includes the zone index used by the new resource partition acquired by aggregating the resource partitions close to the boundary in the second signal unit being different from the zone index used by each resource partition of the at least two adjacent resource partitions.

The interference determination module, specifically configured to:

When the zone index used by the new resource partition acquired by aggregating resource partitions close to the boundary in the second signal unit is different from the zone index used by each resource partition of the at least two adjacent resource partitions, determine that the zone index used after aggregating the at least two adjacent resource partitions does not cause any communication interference with the zone indexes used by the resource partitions in the second signal unit.

According to a third embodiment of the present disclosure, a resource partition aggregating device is provided, the device includes an interface circuit, a memory, and a processor, the memory stores a set of program codes, the processor is used to invoke the program codes stored in the memory to execute the following operations:

Acquiring a resource utilization ratio of each resource partition in a first signal unit;

Determining whether there is a resource utilization ratio of each resource partition of at least two adjacent resource partitions in the first signal unit is less than a first preset threshold;

When there is a resource utilization ratio of each resource partition of at least two adjacent resource partitions in the first signal unit is less than a first preset threshold, determining whether a zone index used after aggregating the at least two adjacent resource partitions causes a communication interference with zone indexes used by resource partitions in an adjacent second signal unit;

If no communication interference is caused, determining area distribution parameters of the aggregated at least two adjacent resource partitions;

Sending a broadcast message carrying the area distribution parameters to a vehicle terminal, the broadcast message being used to instruct the vehicle terminal to determine a zone index of a resource partition in which the vehicle terminal is located and to use a resource pool corresponding to the zone index, according to the area distribution parameters and a pre-acquired geographic location.

The embodiment of the present disclosure, firstly acquires the resource utilization ratio of each resource partition in the first signal unit; and then determines whether there is the resource utilization ratio of each resource partition of at least two adjacent resource partitions in the first signal unit is less than the first preset threshold. When there is the resource utilization ratio of each resource partition of at least two adjacent resource partitions in the first signal unit is less than the first preset threshold, determining whether a zone index used after aggregating the at least two adjacent resource partitions causes a communication interference with zone indexes used by resource partitions in an adjacent second signal unit. If no communication interference is caused, the area distribution parameters of the aggregated at least two adjacent resource partitions is determined. A broadcast message carrying the area distribution parameters is sent to a vehicle terminal. The vehicle terminal determines a zone index of a resource partition in which the vehicle terminal is located and uses a resource pool corresponding to the zone index after receiving the broadcast message, according to the area distribution parameters and a pre-acquired geographic location. Thus, the resource utilization can be improved.

BRIEF DESCRIPTION OF THE DRAWINGS

In order to describe the technical solutions in embodiments of the present disclosure or in the prior art more clearly, the following briefly introduces the accompanying drawings needed for describing the embodiments. The accompanying drawings in the following description show some embodiments of the present disclosure, and persons of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. The described embodiments are a part rather than all of the embodiments of the present disclosure. All other embodiments acquired by persons of ordinary skill in the art based on the embodiments of the present disclosure without creative efforts shall fall within the protection scope of the present disclosure.

Figure 1:
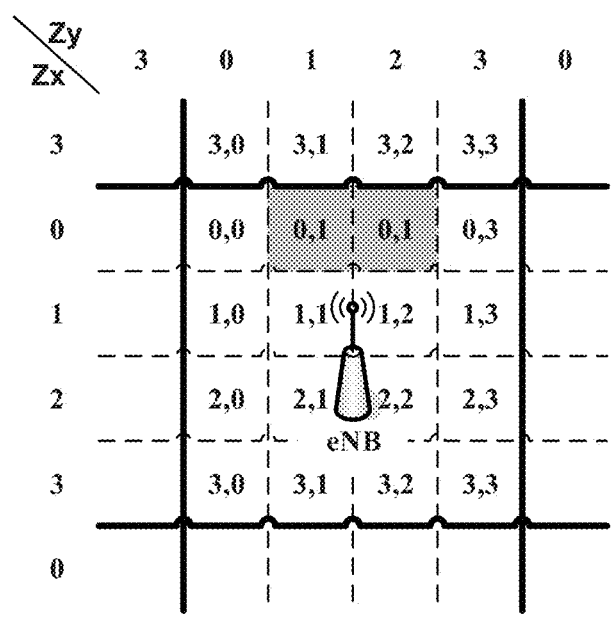
FIG. 1 shows a schematic structural diagram of a resource partition in a signal unit according to the prior art solutions.
Figure 2:
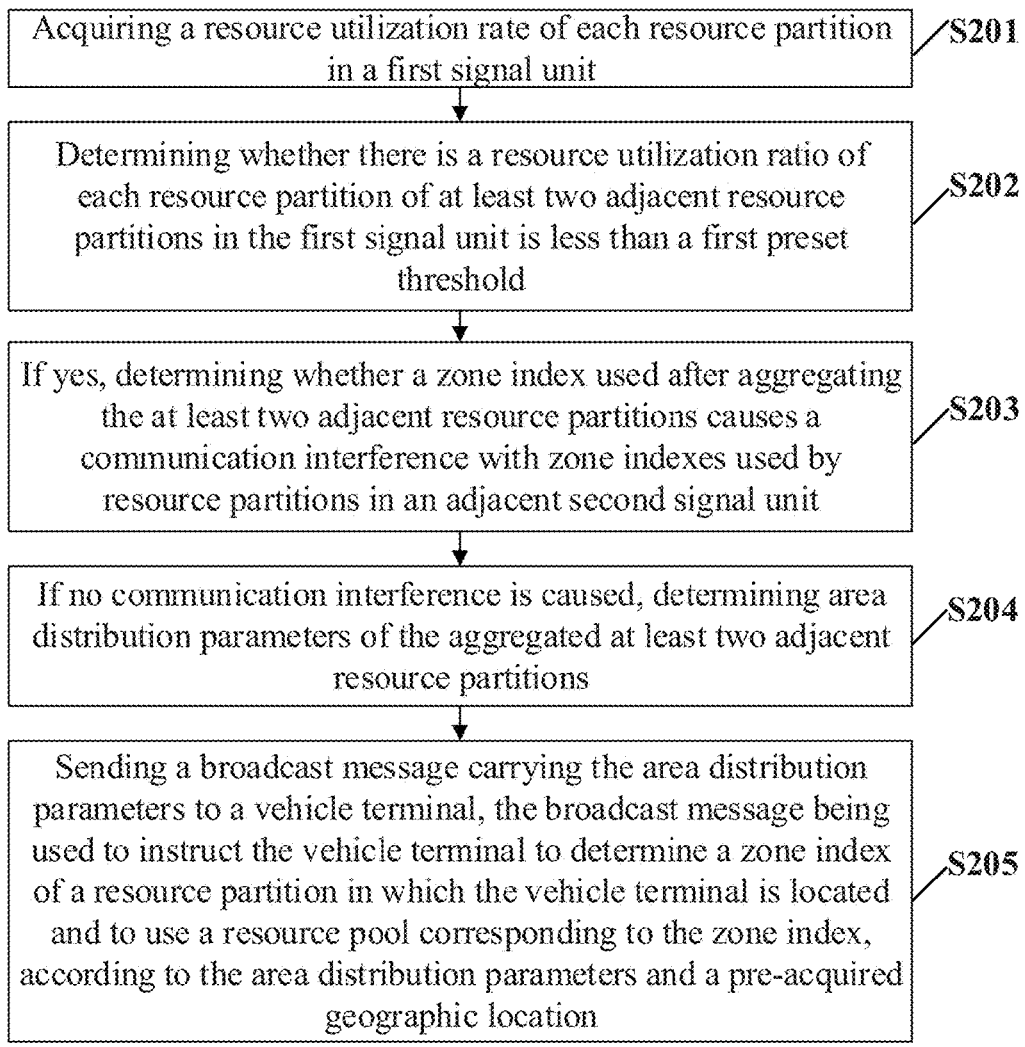
FIG. 2 shows a schematic flow chart of a first embodiment of a resource partition aggregating method according to the present disclosure.

FIG. 2 shows a schematic flow chart of a first embodiment of a resource partition aggregating method according to the present disclosure. The embodiment of the present disclosure can be executed on a base station. As shown in the figure, the method in the embodiment of the present disclosure includes:

S201, acquiring a resource utilization ratio of each resource partition in a first signal unit.

S202, determining whether there is a resource utilization ratio of each resource partition of at least two adjacent resource partitions in the first signal unit is less than a first preset threshold.

Figure 4:
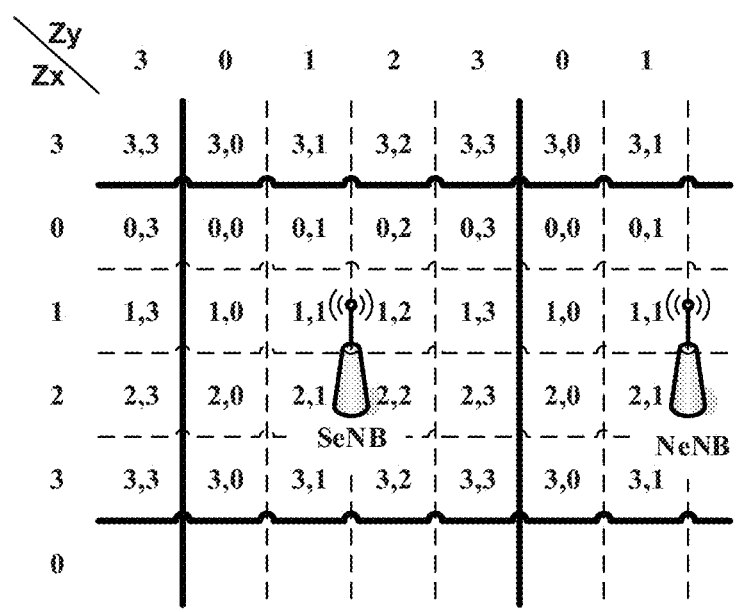
FIG. 4 shows a schematic structural diagram of an embodiment of partitioning a resource partition according to the present disclosure.

In a specific embodiment, if there is no resource utilization ratio of each resource partition of at least two adjacent resource partitions in the first signal unit is less than the first preset threshold, as shown in FIG. 4, S203, When there is a resource utilization ratio of each resource partition of at least two adjacent resource partitions in the first signal unit is less than a first preset threshold, determining whether a zone index used after aggregating the at least two adjacent resource partitions causes a communication interference with zone indexes used by resource partitions in an adjacent second signal unit.

S204, if no communication interference is caused, determining area distribution parameters of the aggregated at least two adjacent resource partitions.

S205, sending a broadcast message carrying the area distribution parameters to a vehicle terminal, the broadcast message being used to instruct the vehicle terminal to determine a zone index of a resource partition in which the vehicle terminal is located and to use a resource pool corresponding to the zone index, according to the area distribution parameters and a pre-acquired geographic location.

Figure 3:
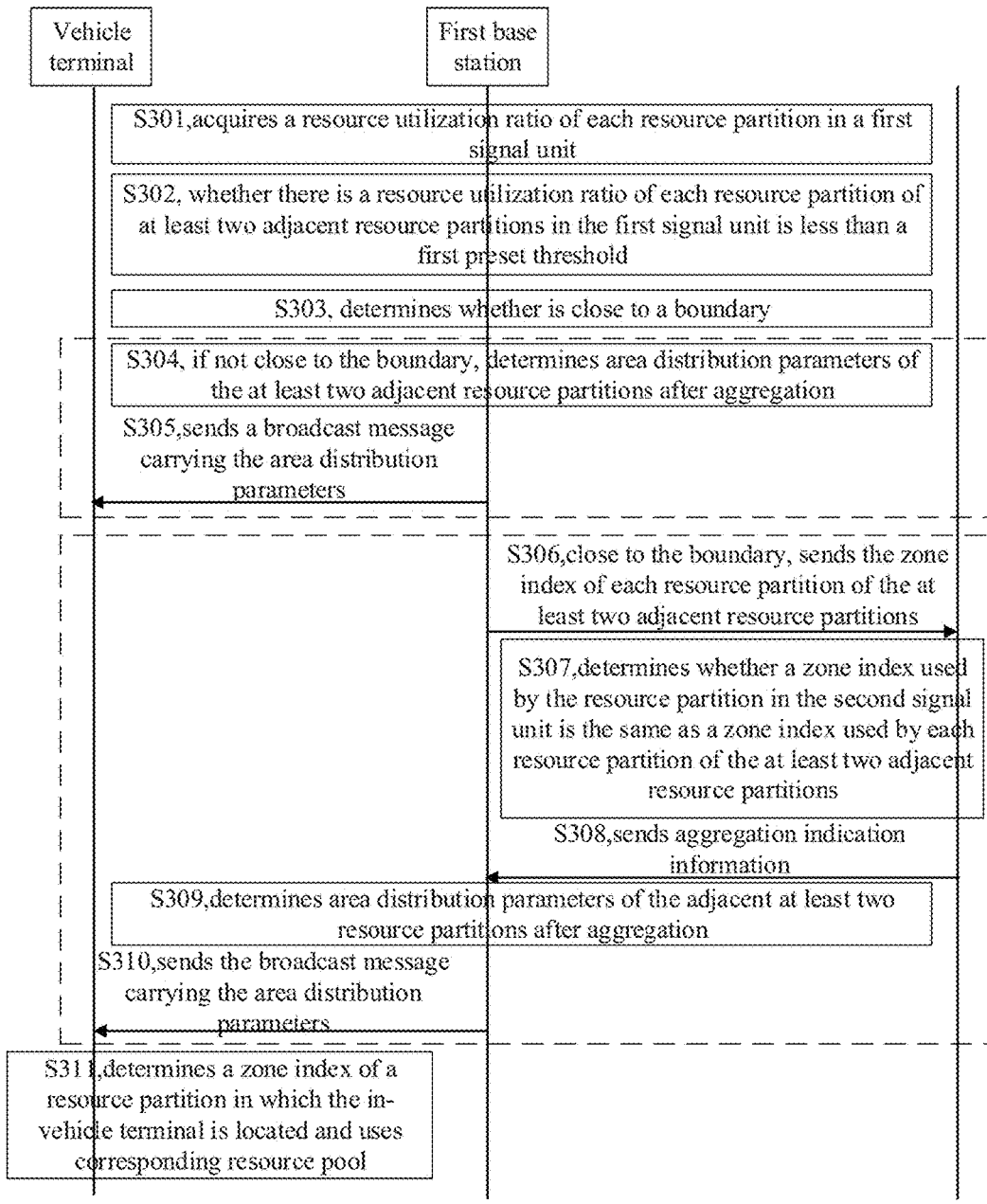
FIG. 3 shows a schematic flow chart of a second embodiment of a resource partition aggregating method according to the present disclosure.

Further referring to FIG. 3, which is a schematic flow chart of a first embodiment of a resource partition aggregating method according to the present disclosure. With reference to the steps shown in FIG. 2, a specific execution process of the embodiment of the present disclosure is provided as follows:

S301, a first base station acquires a resource utilization ratio of each resource partition in a first signal unit.

In a specific embodiment, the first signal unit covered by the first base station can be divided into a plurality of resource partitions, the plurality of resource partitions are identified using different zone indexes. As shown in FIG. 4, the first signal unit covered by a seNB (the first base station) includes 4×4 resource partitions, and the resource partitions are respectively labeled with zone indexes such as (0, 0), (0, 1), . . . (3, 3). Similarly, a second signal unit covered by a NeNB (a second base station) also includes 4×4 resource partitions, and the resource partitions are respectively labeled with zone indexes such as (0, 0), (0, 1), . . . (3, 3). Since two resource partitions close to the boundary between the two signal units respectively use different zone indexes, no communication interference is caused. In addition, since a number of vehicle terminals in each resource partition is different, the resource utilization ratio of each resource partition is also different. If the number of vehicle terminals in a certain resource partition is larger, the resource utilization ratio of the certain resource partition is higher. An amount of signal transmission in each resource partition can be monitored in real-time to acquire the resource utilization ratio of each resource partition.

S302, the first base station determines whether there is a resource utilization ratio of each resource partition of at least two adjacent resource partitions in the first signal unit is less than a first preset threshold.

In a specific embodiment, if there is no resource utilization ratio of each resource partition of at least two adjacent resource partitions in the first signal unit is less than the first preset threshold, the resource partitions in the first signal unit are not aggregated.

S303, When there is a resource utilization ratio of each resource partition of at least two adjacent resource partitions in the first signal unit is less than a first preset threshold, the first base station determines whether each resource partition of the at least two resource partitions is close to a boundary between the first signal unit and a second signal unit.

Figure 5:
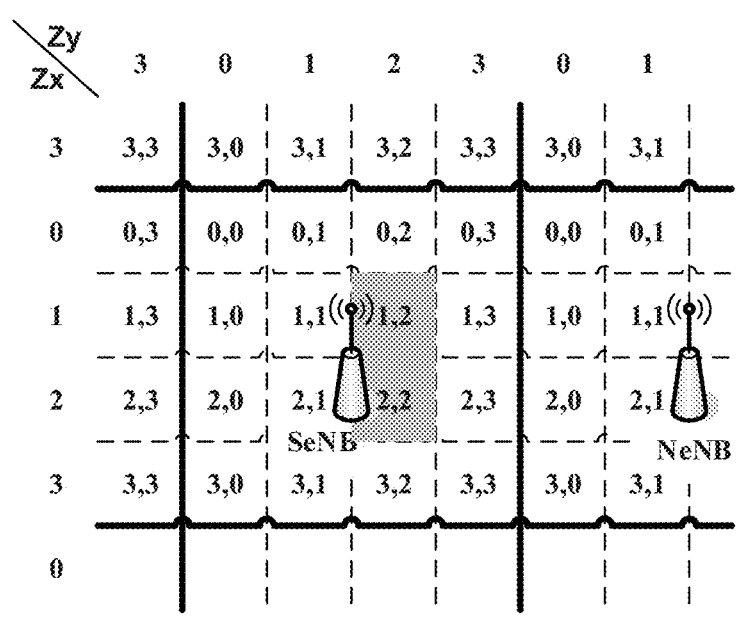
FIG. 5 shows a schematic structural diagram of an embodiment of a resource partition aggregating according to the present disclosure.

In a specific embodiment, as shown in FIG. 5, both of a resource utilization ratio of a resource partition corresponding to a zone index (1, 2) and a resource utilization ratio of a resource partition corresponding to a zone index (2, 2) are less than the first preset threshold, thus it can be determined whether the resource partition corresponding to the zone index (1, 2) or the resource partition corresponding to the zone index (2, 2) is close to the boundary between the first signal unit and the second signal unit.

A scenario of being close to the boundary and a scenario of not being close to the boundary are provided as below, S304 to S305 are execution procedures corresponding to the scenario of not being close to the boundary, and S306 to S310 are execution procedures corresponding to the scenario of being close to the boundary.

S304, when each resource partition of the at least two resource partitions is not close to the boundary, the first base station determines area distribution parameters of the aggregated at least two adjacent resource partitions.

In a specific embodiment, as shown in FIG. 5, the resource partition corresponding to the zone index (1, 2) and the resource partition corresponding to the zone index (2, 2) are not close to the boundary, therefore after the resource partition corresponding to the zone index (1, 2) and the resource partition corresponding to the zone index (2, 2) are aggregated, the communication interference with the resource partition in the second signal unit does not occurred, and the first base station does not need to interact with the second base station that the second signal unit belongs to, but can directly determine the area distribution parameters of the aggregated at least two adjacent resource partitions. For example, an aggregation process of the zone index of the resource partition is defined as a function $\Delta$, $(Z_{x_{CL}}, Z_{y_{CL}}) = \Delta(Z_{x_i}, Z_{y_i})$, where $(Z_{x_i}, Z_{y_i})$ is the zone index of the resource partition to be aggregated, and values of i are 1, 2, ..., $Z_{x_{CL}}$ and $Z_{y_{CL}}$ are respectively new resource partitions after being aggregated.

S305, the first base station sends a broadcast message carrying the area distribution parameters to a vehicle terminal.

In a specific embodiment, when the vehicle terminal is in a new resource partition acquired by aggregating the at least two adjacent resource partitions, the first base station can send the broadcast message carrying the area distribution parameters of the new resource partition acquired by aggregating the at least two adjacent resource partitions to the vehicle terminal. When the vehicle terminal is in another resource partition that is not aggregated, the first base station can send a broadcast message carrying area distribution parameters of a resource partition that is not aggregated, to the vehicle terminal. The area distribution parameters includes a hash function required to calculate the zone index and calculation parameters in the hash function.

S306, when each resource partition of the at least two resource partitions is close to the boundary, the first base station sends the zone index of each resource partition of the at least two adjacent resource partitions to the base station that the second signal unit belongs to.

Figure 6:
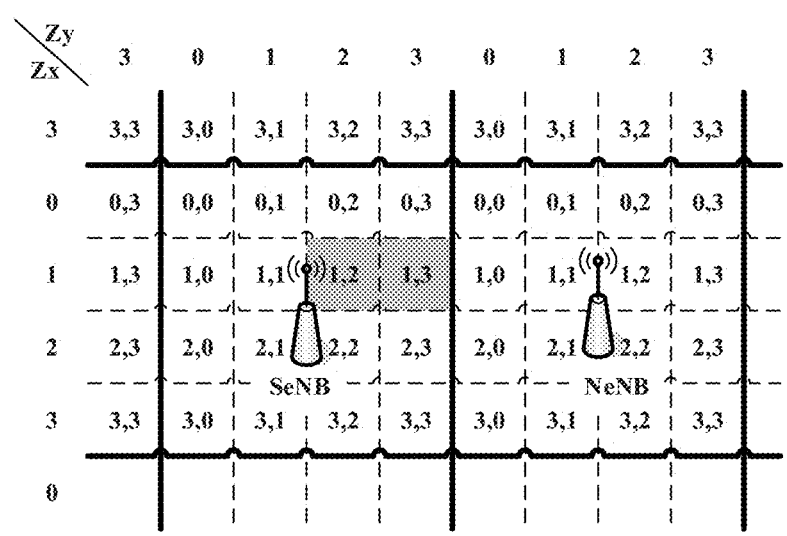
FIG. 6 shows a schematic structural diagram of another embodiment of a resource partition aggregating according to the present disclosure.

In a specific embodiment, as shown in FIG. 6, the resource partition corresponding to the zone index (1, 2) and a resource partition corresponding to a zone index (1, 3) need to be aggregated, the resource partition corresponding to the zone index (1, 3) is close to the boundary between a first resource partition and a second resource partition. Since the new resource partition acquired by aggregating the resource partitions corresponding to the zone index (1, 2) and the resource partition corresponding to the zone index (1, 3) may use the same zone indexes as the resource partitions close to the boundary in the second resource partition, therefore, the first base station needs to interact with the second base station that the second signal unit belongs to, to send the zone index of each resource partition of the at least two adjacent resource partitions to the second base station.

Figure 7:
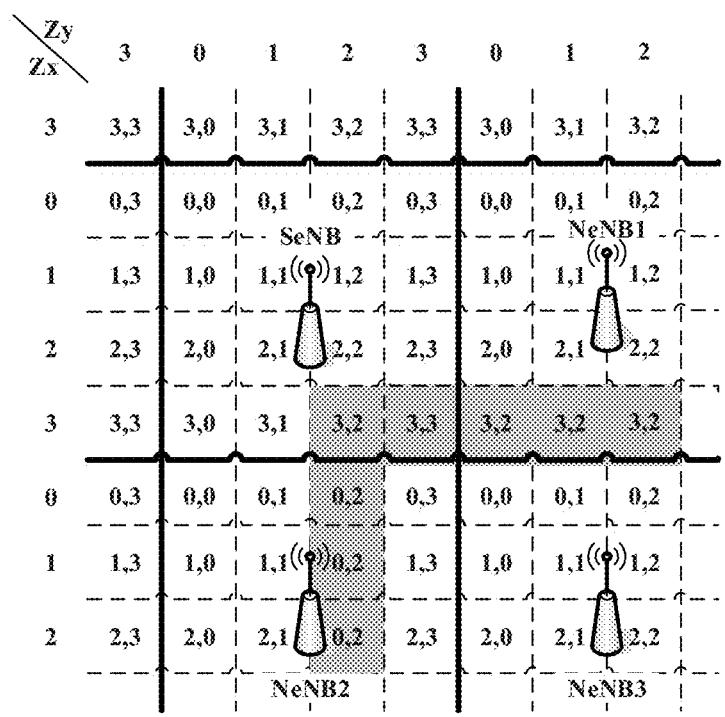
FIG. 7 shows a schematic structural diagram of another embodiment of a resource partition aggregating according to the present disclosure.

Optionally, as shown in FIG. 7, a resource partition corresponding to a zone index (3, 2) and a resource partition corresponding to a zone index (3, 3) need to be aggregated, the two resource partition are respectively bordered by other two signal units (e.g., the second signal unit and a third signal unit). Since the new resource partition acquired by aggregating the resource partitions corresponding to the zone index (3, 2) and the resource partition corresponding to the zone index (3, 3) may use the same zone index as the resource partitions in the two signal units that are close to the boundary, therefore, the first base station needs to simultaneously interact with the base stations that the other two signal units belongs to, to send the zone index of each resource partition of the at least two adjacent resource partitions to the second base station and the third base station respectively.

S307, the second base station determines whether a zone index used by the resource partition in the second signal unit is the same as a zone index used by each resource partition of the at least two adjacent resource partitions.

In a specific embodiment, as shown in FIG. 6, since the resource partitions in the second signal unit are not aggregated, the zone index used by the new resource partition acquired by aggregating the resource partitions corresponding to the zone index (1, 2) and the resource partition corresponding to the zone index (1, 3) in the first signal unit may be (1, 2) or (1, 3), which is different from a zone index (1, 0) in the second signal unit at the boundary. Thus, it is determined that the zone index used after aggregating the at least two adjacent resource partitions does not cause any communication interference with the zone index used by the resource partitions in the second signal unit.

Figure 8:
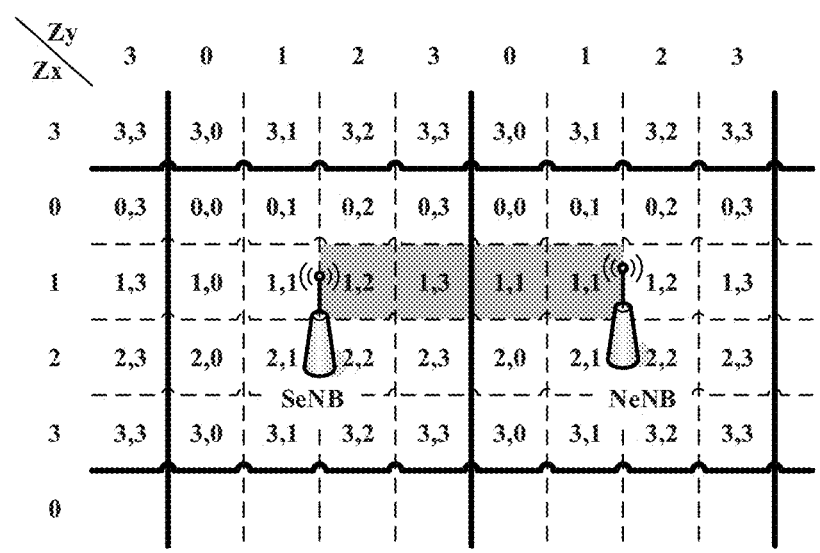
FIG. 8 shows a schematic structural diagram of another embodiment of a resource partition aggregating according to the present disclosure.

As shown in FIG. 8, a resource partition corresponding to a zone index (1, 1) and the resource partition corresponding to the zone index (1, 2) close to the boundary in the second signal unit are aggregated, and the zone index used by the new resource partition acquired by aggregating is (1, 1). The zone index used by the new resource partition acquired by aggregating the resource partitions corresponding to the zone index (1, 2) and resource partition corresponding to the zone index (1, 3) in the first signal unit may be (1, 2) or (1, 3). Therefore, the zone index used by the new resource partition acquired by aggregating the resource partitions close to the boundary in the second signal unit is different from the zone index used by each resource partition of the at least two adjacent resource partition. Thus, the second base station notifies the first base station that the zone index used by the new resource partition acquired by aggregating the resource partitions close to the boundary in the second signal unit and the zone index used by each resource partition of the at least two adjacent resource partition are different.

Figure 9:
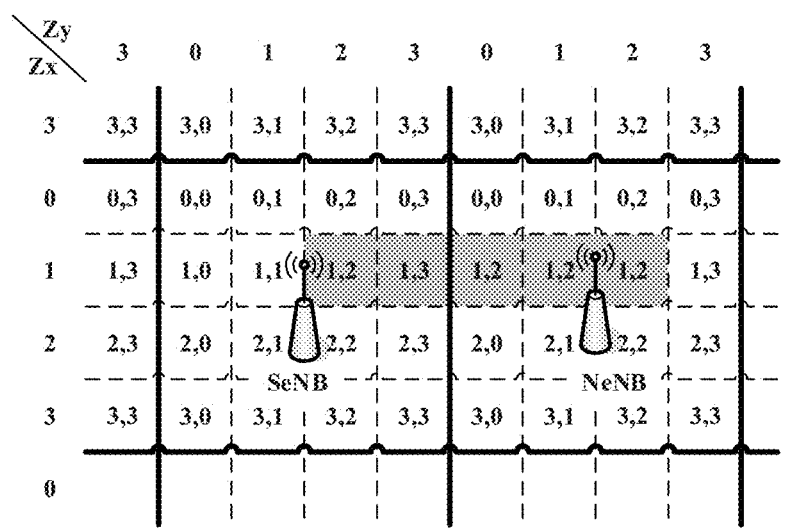
FIG. 9 shows a schematic structural diagram of another embodiment of a resource partition aggregating according to the present disclosure.

As shown in FIG. 9, the resource partition corresponding to the zone index (1, 1), the resource partition corresponding to the zone index (1, 2) and a resource partition corresponding to the zone index (1, 3) close to the boundary in the second signal unit are aggregated, and the zone index used by the new resource partition acquired by aggregating is (1, 2). The zone index used by the new resource partition acquired by aggregating the resource partitions corresponding to the zone index (1, 2) and resource partition corresponding to the zone index (1, 3) in the first signal unit may be (1, 2) or (1, 3). Therefore, the zone index (1, 2) used by the new resource partition acquired by aggregating the resource partitions close to the boundary in the second signal unit is the same as the zone index (1, 2) used by the new resource partition acquired by aggregating in the first signal unit. When the area index used by the new resource partition acquired by aggregating the at least two adjacent resource partitions is (1, 2), then it can cause a communication interference with the area index used by the resource partition in the second signal unit. Therefore, the second base station needs to notify the first base station that the zone index used by the new resource partition acquired by aggregating the resource partitions close to the boundary in the second signal unit is the same as the zone index used by a target resource partition of the at least two adjacent resource partition.

As shown in FIG. 7, a resource partition corresponding to a zone index (3, 0), a resource partition corresponding to a zone index (3, 1) and the resource partition corresponding to the zone index (3, 2) close to the boundary in the second signal unit are aggregated, and the zone index used by the new resource partition acquired by aggregating is (3, 2). A resource partition corresponding to a zone index (0, 2), the resource partition corresponding to the zone index (1, 2) and the resource partition corresponding to the zone index (2, 2) close to the boundary in the third signal unit are aggregated, and the zone index used by the new resource partition acquired by aggregating is (0, 2). The zone index used by the new resource partition acquired by aggregating the resource partitions corresponding to the zone index (3, 2) and resource partition corresponding to the zone index (3, 3) in the first signal unit may be (3, 2) or (3, 3). Therefore, the zone index (3, 2) used by the new resource partition acquired by aggregating the resource partitions close to the boundary in the second signal unit is the same as the zone index (3, 2) used by the new resource partition acquired by aggregating in the first signal unit. The zone index used by the new resource partition acquired by aggregating the resource partitions close to the boundary in the third signal unit is different from the zone index used by each resource partition of the at least two adjacent resource partition. The second base station that the second signal unit belongs to, needs to notify the first base station that the zone index used by the new resource partition acquired by aggregating the resource partitions close to the boundary in the second signal unit is the same as the zone index used by a target resource partition of the at least two adjacent resource partition. The third base station to which the third signal unit belongs needs to notify the first base station that the zone index used by the new resource partition acquired by aggregating the resource partitions close to the boundary in the second signal unit is different from the zone index used by each resource partition of the at least two adjacent resource partition.

S308, the second base station sends aggregation indication information to the first base station.

The aggregation indication information includes the zone index used by the new resource partition acquired by aggregating the resource partitions close to the boundary in the second signal unit is the same as the zone index used by a target resource partition of the at least two adjacent resource partition. Or the aggregation indication information includes the resource partitions close to the boundary in the second signal unit not being aggregated. Or the aggregation indication new resource partition acquired by aggregating the resource partitions close to the boundary in the second signal unit being different from the zone index used by each resource partition of the at least two adjacent resource partition.

S309, the first base station determines area distribution parameters of the aggregated at least two adjacent resource partitions.

In a specific embodiment, after receiving the aggregation indication information, the first base station can firstly determine whether a communication interference is caused by the zone index used after aggregating the at least two adjacent resource partitions and the zone indexes used by resource partitions in the second signal unit, according to the aggregation indication information.

Moreover, if the aggregation indication information includes the zone index used by the new resource partition acquired by aggregating the resource partitions close to the boundary in the second signal unit is the same as the zone index used by a target resource partition of the at least two adjacent resource partition, the zone index used by the target resource partition of the at least two adjacent resource partitions can be removed, to determine that the zone index used after aggregating the at least two adjacent resource partitions does not cause any communication interference with the zone indexes used by the resource partitions in the adjacent second signal. When the resource partitions close to the boundary in the second signal unit are not aggregated, it can be determine that the zone index used after aggregating the at least two adjacent resource partitions does not cause any communication interference with the zone indexes used by the resource partitions in the adjacent second signal. If the zone index used by the new resource partition acquired by aggregating the resource partitions close to the boundary in the second signal unit is different from the zone index used by each resource partition of the at least two adjacent resource partition, it can be determined that the zone index used after aggregating the at least two adjacent resource partitions does not cause any communication interference with the zone indexes used by the resource partitions in the adjacent second signal.

The zone index of the resource partition to be aggregated is put into the function $(Z_{x_{CL}}, Z_{y_{CL}}) = \Delta(Z_{x_i}, Z_{y_i})$, thus the zone index of the new resource partition after being aggregated can be acquired. The aggregation process of the zone index of the resource partition can be defined as the function $\Delta$, $(Z_{x_{CL}}, Z_{y_{CL}}) = \Delta(Z_{x_i}, Z_{y_i})$, in which $(Z_{x_i}, Z_{y_i})$ is the zone index of the resource partition to be aggregated, and values of i are 1, 2, . . . , $Z_{x_{CL}}$ and $Z_{y_{CL}}$ are respectively new resource partitions after being aggregated.

Optionally, before determining the area distribution parameters of the aggregated at least two adjacent resource partitions, it is determined whether a resource utilization ratio of the new resource partition acquired by aggregating the at least two adjacent resource partitions is greater than a second preset threshold. Whew the resource utilization ratio of the new resource partition is not greater than the second preset threshold, the step of determining the area distribution parameters of the aggregated at least two adjacent resource partitions is executed. When the resource utilization ratio of the new resource partition is greater than the second preset threshold, the at least two adjacent resource partitions are not aggregated.

S310, the first base station sends the broadcast message carrying the area distribution parameters to the vehicle terminal.

In a specific embodiment, when the vehicle terminal is in a new resource partition acquired by aggregating the at least two adjacent resource partitions, the first base station can send the broadcast message carrying the area distribution parameters of the new resource partition acquired by aggregating the at least two adjacent resource partitions, to the vehicle terminal. When the vehicle terminal is in another resource partition that is not aggregated, the first base station can send a broadcast message carrying an area distribution parameter of resource partition that is not aggregated, to the vehicle terminal. The area distribution parameters includes a hash function required to calculate the zone index and calculation parameters in the hash function.

S311, the vehicle terminal determines a zone index of a resource partition in which the vehicle terminal is located and uses a resource pool corresponding to the zone index, according to the area distribution parameters and a pre-acquired geographic location. The geographic location can include geographic coordinates.

In a specific embodiment, when the vehicle terminal is in a new resource partition acquired by aggregating the at least two adjacent resource partitions, the vehicle terminal can substitute the area distribution parameter and the geographic coordinates into the hash function of the aggregated new resource partition, to acquire the zone index of the aggregated new resource partition in which the vehicle terminal is located, and use the resource pool corresponding to the zone index.

The embodiment of the present disclosure, firstly acquires the resource utilization ratio of each resource partition in the first signal unit; and then determines whether there is the resource utilization ratio of each resource partition of at least two adjacent resource partitions in the first signal unit is less than the first preset threshold. When there is the resource utilization ratio of each resource partition of at least two adjacent resource partitions in the first signal unit is less than the first preset threshold, determining whether a zone index used after aggregating the at least two adjacent resource partitions causes a communication interference with zone indexes used by resource partitions in an adjacent second signal unit. If no communication interference is caused, the area distribution parameters of the aggregated at least two adjacent resource partitions is determined. A broadcast message carrying the area distribution parameters is sent to a vehicle terminal. The vehicle terminal determines a zone index of a resource partition in which the vehicle terminal is located and to use a resource pool corresponding to the zone index after receiving the broadcast message, according to the area distribution parameters and a pre-acquired geographic location. Thus, the resource utilization can be improved.

Figure 10:
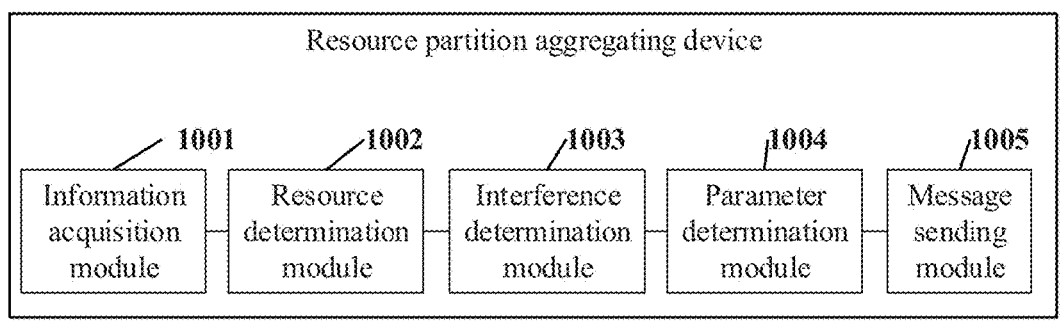
FIG. 10 shows a schematic structural diagram of an embodiment of a resource partition aggregating device according to the present disclosure.

Further referring to FIG. 10, which is a schematic structural diagram of an embodiment of a resource partition aggregating device according to the present disclosure. As shown in the figure, the device in the embodiment of the present disclosure includes:

An information acquisition module 1001, configured to acquire a resource utilization ratio of each resource partition in a first signal unit.

In a specific embodiment, the first signal unit covered by the first base station can be divided into a plurality of resource partitions, the plurality of resource partitions are identified using different zone indexes. As shown in FIG. 4, the first signal unit covered by a seNB (the first base station) includes 4×4 resource partitions, and the resource partitions are respectively labeled with zone indexes such as (0, 0), (0, 1), . . . (3, 3). Similarly, a second signal unit covered by a NeNB (a second base station) also includes 4×4 resource partitions, and the resource partitions are respectively labeled with zone indexes such as (0, 0), (0, 1), . . . (3, 3). Since two resource partitions close to the boundary between the two signal units respectively use different zone indexes, no communication interference is caused. In addition, since a number of vehicle terminals in each resource partition is different, the resource utilization ratio of each resource partition is also different. If the number of vehicle terminals in a certain resource partition is larger, the resource utilization ratio of the certain resource partition is higher. An amount of signal transmission in each resource partition can be monitored in real-time to acquire the resource utilization ratio of each resource partition.

A resource determination module 1002, configured to determine whether there is a resource utilization ratio of each resource partition of at least two adjacent resource partitions in the first signal unit is less than a first preset threshold.

In a specific embodiment, if there is no resource utilization ratio of each resource partition of at least two adjacent resource partitions in the first signal unit is less than the first preset threshold, the resource partitions in the first signal unit are not aggregated.

When there is a resource utilization ratio of each resource partition of at least two adjacent resource partitions in the first signal unit is less than a first preset threshold, an interference determination module 1003 configured to, determine whether a zone index used after aggregating the at least two adjacent resource partitions causes a communication interference with zone indexes used by resource partitions in an adjacent second signal unit.

In a specific embodiment, determine whether each resource partition of the at least two resource partitions is close to a boundary between the first signal unit and the second signal unit; when each resource partition of the at least two resource partitions is not close to the boundary, it can be determined that the zone index used after aggregating the at least two adjacent resource partitions does not cause any communication interference with the zone indexes used by the resource partitions in the second signal unit.

As shown in FIG. 5, both of a resource utilization ratio of a resource partition corresponding to a zone index (1, 2) and a resource utilization ratio of a resource partition corresponding to a zone index (2, 2) are less than the first preset threshold, thus it can be determined whether the resource partition corresponding to the zone index (1, 2) or the resource partition corresponding to the zone index (2, 2) is close to the boundary between the first signal unit and the second signal unit. The resource partition corresponding to the zone index (1, 2) and the resource partition corresponding to the zone index (2, 2) are not close to the boundary, therefore after the resource partition corresponding to the zone index (1, 2) and the resource partition corresponding to the zone index (2, 2) are aggregated, the communication interference with the resource partition in the second signal unit does not occurred, and the first base station does not need to interact with the second base station that the second signal unit belongs to.

Optionally, it can be determined that whether each resource partition of the at least two resource partitions is close to a boundary between the first signal unit and the second signal unit; when each resource partition of the at least two resource partitions is close to the boundary, it can be send the zone index used by each resource partition of the at least two adjacent resource partitions to a base station that the second signal unit belongs to.

As shown in FIG. 6, the resource partition corresponding to the zone index (1, 2) and a resource partition corresponding to a zone index (1, 3) need to be aggregated, the resource partition corresponding to the zone index (1, 3) is close to the boundary between a first resource partition and a second resource partition. Since the new resource partition acquired by aggregating the resource partitions corresponding to the zone index (1, 2) and the resource partition corresponding to the zone index (1, 3) may use the same zone indexes as the resource partitions close to the boundary in the second resource partition, therefore, the first base station needs to interact with the second base station that the second signal unit belongs to, to send the zone index of each resource partition of the at least two adjacent resource partitions to the second base station.

As shown in FIG. 7, a resource partition corresponding to a zone index (3, 2) and a resource partition corresponding to a zone index (3, 3) need to be aggregated, the two resource partition are respectively bordered by other two signal units (e.g., the second signal unit and a third signal unit). Since the new resource partition acquired by aggregating the resource partitions corresponding to the zone index (3, 2) and the resource partition corresponding to the zone index (3, 3) may use the same zone index as the resource partitions in the two signal units that are close to the boundary, therefore, the first base station needs to simultaneously interact with the base stations that the other two signal units belongs to, to send the zone index of each resource partition of the at least two adjacent resource partitions to the second base station and the third base station respectively.

After receiving the zone index of each resource partition of the at least two adjacent resource partitions, the second base station determines whether the zone index used by the resource partitions close to the boundary in the second signal unit is the same as the zone index of each resource partition of the at least two adjacent resource partitions, and return aggregation indication information. The first base station determines whether a communication interference is caused by the zone index used after aggregating the at least two adjacent resource partitions and the zone indexes used by the resource partitions in the second signal, according to the aggregation indication information.

As shown in FIG. 6, since the resource partitions in the second signal unit are not aggregated, the zone index used by the new resource partition acquired by aggregating the resource partitions corresponding to the zone index (1, 2) and a resource partition corresponding to the zone index (1, 3) in the first signal unit may be (1, 2) or (1, 3), which is different from a zone index (1, 0) in the second signal unit at the boundary. Thus, it is determined that the zone index used after aggregating the at least two adjacent resource partitions does not cause any communication interference with the zone index used by the resource partitions in the second signal unit.

As shown in FIG. 8, a resource partition corresponding to a zone index (1, 1) and the resource partition corresponding to the zone index (1, 2) close to the boundary in the second signal unit are aggregated, and the zone index used by the new resource partition acquired by aggregating is (1, 1). The zone index used by the new resource partition acquired by aggregating the resource partitions corresponding to the zone index (1, 2) and resource partition corresponding to the zone index (1, 3) in the first signal unit may be (1, 2) or (1, 3). Therefore, the zone index used by the new resource partition acquired by aggregating the resource partitions close to the boundary in the second signal unit is different from the zone index used by each resource partition of the at least two adjacent resource partition. Thus, the second base station notifies the first base station that the zone index used by the new resource partition acquired by aggregating the resource partitions close to the boundary in the second signal unit and the zone index used by each resource partition of the at least two adjacent resource partition are different.

As shown in FIG. 9, the resource partition corresponding to the zone index (1, 1), the resource partition corresponding to the zone index (1, 2) and a resource partition corresponding to the zone index (1, 3) close to the boundary in the second signal unit are aggregated, and the zone index used by the new resource partition acquired by aggregating is (1, 2). The zone index used by the new resource partition acquired by aggregating the resource partitions corresponding to the zone index (1, 2) and resource partition corresponding to the zone index (1, 3) in the first signal unit may be (1, 2) or (1, 3). Therefore, the zone index (1, 2) used by the new resource partition acquired by aggregating the resource partitions close to the boundary in the second signal unit is the same as the zone index (1, 2) used by the new resource partition acquired by aggregating in the first signal unit. When the area index used by the new resource partition acquired by aggregating the at least two adjacent resource partitions is (1, 2), then it can cause a communication interference with the area index used by the resource partition in the second signal unit. Therefore, the second base station needs to notify the first base station that the zone index used by the new resource partition acquired by aggregating the resource partitions close to the boundary in the second signal unit is the same as the zone index used by a target resource partition of the at least two adjacent resource partition.

As shown in FIG. 7, a resource partition corresponding to a zone index (3, 0), a resource partition corresponding to a zone index (3, 1) and the resource partition corresponding to the zone index (3, 2) close to the boundary in the second signal unit are aggregated, and the zone index used by the new resource partition acquired by aggregating is (3, 2). A resource partition corresponding to a zone index (0, 2), the resource partition corresponding to the zone index (1, 2) and the resource partition corresponding to the zone index (2, 2) close to the boundary in the third signal unit are aggregated, and the zone index used by the new resource partition acquired by aggregating is (0, 2). The zone index used by the new resource partition acquired by aggregating the resource partitions corresponding to the zone index (3, 2) and resource partition corresponding to the zone index (3, 3) in the first signal unit may be (3, 2) or (3, 3). Therefore, the zone index (3, 2) used by the new resource partition acquired by aggregating the resource partitions close to the boundary in the second signal unit is the same as the zone index (3, 2) used by the new resource partition acquired by aggregating in the first signal unit. The zone index used by the new resource partition acquired by aggregating the resource partitions close to the boundary in the third signal unit is different from the zone index used by each resource partition of the at least two adjacent resource partition. The second base station that the second signal unit belongs to, needs to notify the first base station that the zone index used by the new resource partition acquired by aggregating the resource partitions close to the boundary in the second signal unit is the same as the zone index used by a target resource partition of the at least two adjacent resource partition. The third base station to which the third signal unit belongs needs to notify the first base station that the zone index used by the new resource partition acquired by aggregating the resource partitions close to the boundary in the second signal unit is different from the zone index used by each resource partition of the at least two adjacent resource partition.

A parameter determination module 1004, configured to, if no communication interference is caused, determine area distribution parameters of the aggregated at least two adjacent resource partitions.

In a specific embodiment, according to the aggregation indication information, whether a communication interference is caused by the zone index used after aggregating the at least two adjacent resource partitions and the zone indexes used by resource partitions in the second signal unit can be determined.

Moreover, if the aggregation indication information includes the zone index used by the new resource partition acquired by aggregating the resource partitions close to the boundary in the second signal unit is the same as the zone index used by a target resource partition of the at least two adjacent resource partition, the zone index used by the target resource partition of the at least two adjacent resource partitions can be removed, to determine that the zone index used after aggregating the at least two adjacent resource partitions does not cause any communication interference with the zone indexes used by the resource partitions in the adjacent second signal. When the resource partitions close to the boundary in the second signal unit are not aggregated, it can be determine that the zone index used after aggregating the at least two adjacent resource partitions does not cause any communication interference with the zone indexes used by the resource partitions in the adjacent second signal. If the zone index used by the new resource partition acquired by aggregating the resource partitions close to the boundary in the second signal unit is different from the zone index used by each resource partition of the at least two adjacent resource partition, it can be determined that the zone index used after aggregating the at least two adjacent resource partitions does not cause any communication interference with the zone indexes used by the resource partitions in the adjacent second signal.

The zone index of the resource partition to be aggregated is put into the function $(Z_{x_{CL}}, Z_{y_{CL}}) = \Delta(Z_{x_i}, Z_{y_i})$, thus the zone index of the new resource partition after being aggregated can be acquired. The aggregation process of the zone index of the resource partition can be defined as the function $\Delta$, $(Z_{x_{CL}}, Z_{y_{CL}}) = \Delta(Z_{x_i}, Z_{y_i})$, in which $(Z_{x_i}, Z_{y_i})$ is the zone index of the resource partition to be aggregated, and values of i are 1, 2, ..., $Z_{x_{CL}}$ and $Z_{y_{CL}}$ are respectively new resource partitions after being aggregated.

Optionally, before determining the area distribution parameters of the aggregated at least two adjacent resource partitions, it is determined whether a resource utilization ratio of new resource partition acquired by aggregating the at least two adjacent resource partitions is greater than a second preset threshold. When the resource utilization ratio of the new resource partition is not greater than the second preset threshold, the step of determining the area distribution parameters of the aggregated at least two adjacent resource partitions is executed. When the resource utilization ratio of the new resource partition is greater than the second preset threshold, the at least two adjacent resource partitions are not aggregated.

A message sending module 1005, configured to, send a broadcast message carrying the area distribution parameters to a vehicle terminal, the broadcast message being used to instruct the vehicle terminal to determine a zone index of a resource partition in which the vehicle terminal is located and to use a resource pool corresponding to the zone index, according to the area distribution parameters and a pre-acquired geographic location In a specific embodiment, when the vehicle terminal is in a new resource partition acquired by aggregating the at least two adjacent resource partitions, the first base station can send the broadcast message carrying the area distribution parameters of the new resource partition acquired by aggregating the at least two adjacent resource partitions to the vehicle terminal. When the vehicle terminal is in another resource partition that is not aggregated, the first base station can send a broadcast message carrying area distribution parameters of a resource partition that is not aggregated to the vehicle terminal. The area distribution parameters includes a hash function required to calculate the zone index and calculation parameters in the hash function. After receiving the broadcast message, the vehicle terminal can substitute the area distribution parameter and the geographic coordinates into the hash function of the aggregated new resource partition, to acquire the zone index of the aggregated new resource partition in which the vehicle terminal is located, and use the resource pool corresponding to the zone index.

Figure 11:
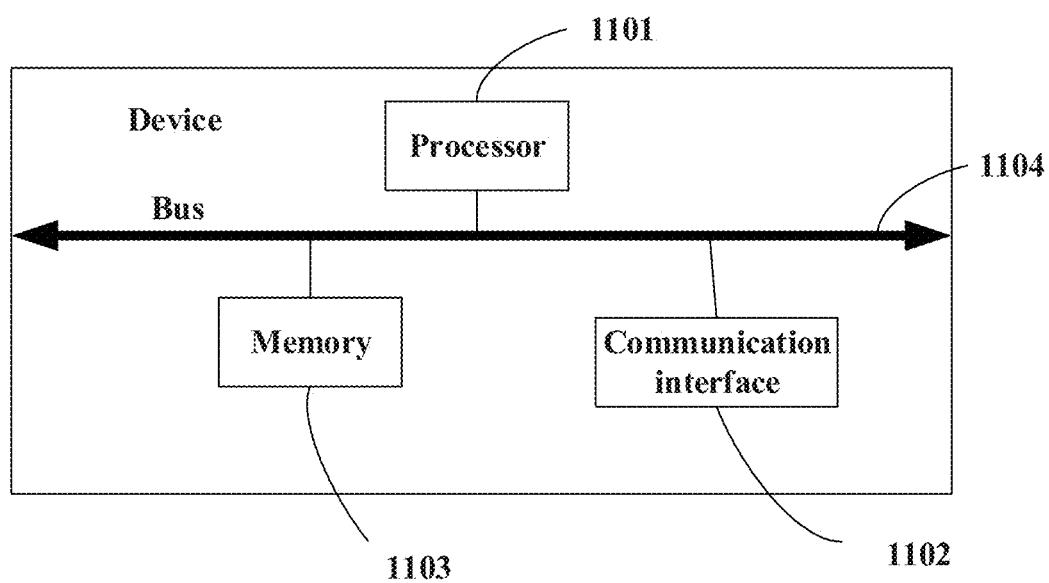
FIG. 11 shows a schematic structural diagram of another embodiment of a resource partition aggregating device according to the present disclosure.

Please refer to FIG. 11, which is a schematic structural diagram of another embodiment of a resource partition aggregating device according to the present disclosure. As shown in the figure, the device can include: at least one processor 1101, such as a Central Processing Unit (CPU), at least one communication interface 1102, at least one memory 1103, and at least one bus 1104. The bus 1104 is used to implement connection communication between these components. The communication interface 1102 of the device in the embodiment of the present disclosure can be a wired transmission port, and can also be a wireless device, for example, including an antenna device, for performing signaling or data communication with other node devices. The memory 1103 can be a high speed RAM memory or a non-volatile memory such as at least one disk memory. Optionally, the memory 1103 can also be at least one storage device located remotely from the aforementioned processor 1101. The memory 1103 stores a set of program codes. The processor 1101 is used to invoke the program codes stored in the memory 1103 to execute the following operations:

Acquiring a resource utilization ratio of each resource partition in a first signal unit;

Determining whether there is a resource utilization ratio of each resource partition of at least two adjacent resource partitions in the first signal unit is less than a first preset threshold;

When there is a resource utilization ratio of each resource partition of at least two adjacent resource partitions in the first signal unit is less than a first preset threshold, determining whether a zone index used after aggregating the at least two adjacent resource partitions causes a communication interference with zone indexes used by resource partitions in an adjacent second signal unit;

If no communication interference is caused, determining area distribution parameters of the aggregated at least two adjacent resource partitions;

Sending a broadcast message carrying the area distribution parameters to a vehicle terminal, the broadcast message being used to instruct the vehicle terminal to determine a zone index of a resource partition in which the vehicle terminal is located and to use a resource pool corresponding to the zone index, according to the area distribution parameters and a pre-acquired geographic location.

The processor 1101 is further used to execute the following operations:

Determining whether a resource utilization ratio of a new resource partition acquired by aggregating the at least two adjacent resource partitions is greater than a second preset threshold;

When the resource utilization ratio of the new resource partition is not greater than the second preset threshold, the step of determining the area distribution parameters of the aggregated at least two adjacent resource partitions is executed.

The processor 1101 is further used to execute the following operations:

Determining whether each resource partition of the at least two resource partitions is close to a boundary between the first signal unit and the second signal unit;

When each resource partition of the at least two resource partitions is not close to the boundary, determining that the zone index used after aggregating the at least two adjacent resource partitions does not cause any communication interference with the zone indexes used by the resource partitions in the second signal unit.

The processor 1101 is further used to execute the following operations:

Determining whether each resource partition of the at least two resource partitions is close to a boundary between the first signal unit and the second signal unit;

When each resource partition of the at least two resource partitions is close to the boundary, sending the zone index of each resource partition of the at least two adjacent resource partitions to a base station that the second signal unit belongs to, to enable the base station to determine whether zone indexes used by the resource partitions close to the boundary in the second signal unit are the same as the zone index of each resource partition of the at least two adjacent resource partitions, and return aggregation indication information;

According to the aggregation indication information, determining whether a communication interference is caused by the zone index used after aggregating the at least two adjacent resource partitions and the zone indexes used by the resource partitions in the second signal unit.

The processor 1101 is further used to execute the following operations:

Removing the zone index used by the target resource partition of the at least two adjacent resource partitions, to determine that the zone index used after aggregating the at least two adjacent resource partitions does not cause any communication interference with the zone indexes used by the resource partitions in the adjacent second signal.

The processor 1101 is further used to execute the following operations:

When the resource partitions close to the boundary in the second signal unit are not aggregated, determining that the zone index used after aggregating the at least two adjacent resource partitions does not cause any communication interference with the zone indexes used by the resource partitions in the adjacent second signal.

The processor 1101 is further used to execute the following operations:

When the zone index used by the new resource partition acquired by aggregating resource partitions close to the boundary in the second signal unit is different from the zone index used by each resource partition of the at least two adjacent resource partitions, determining that the zone index used after aggregating the at least two adjacent resource partitions does not cause any communication interference with the zone indexes used by the resource partitions in the adjacent second signal.

It should be noted that, for a simple description, the above method embodiments expressed as a series of action combinations, but those skilled in the art should understand that the present disclosure is not limited by the described action sequence. According to the present disclosure, some steps in the above embodiments can be performed in other sequences or simultaneously. Secondly, those skilled in the art should also understand that the embodiments described in the specification are all optional embodiments, and the actions and units involved are not necessarily required by the present disclosure.

In the above embodiments, descriptions of each embodiment has different focuses, and when there is no detail part in a certain embodiment, please refer to relevant parts of other embodiments.

Persons of ordinary skill in the art can understand that all or part of the processes of the above embodiments may be implemented by executing a computer program by related hardware. The program may be stored in a computer readable storage medium. The storage medium can include a flash memory, a Read-Only Memory (ROM), a Random Access Memory (RAM), an optical disc storage, a disk storage, and the like.

A content downloading method, related devices and a system provided by the embodiments of the present disclosure are described in detail above. The principles and implementation manners of the present disclosure are described in a specific example. The descriptions of the above embodiments are only used to help understand the method of the present disclosure and its core idea. At the same time, for the person of ordinary skill in the art, according to the idea of the present disclosure, there will be some changes in the specific embodiments and the scope of application. In summary, the content of this specification should not be understood as limiting the present disclosure.

We claim:

1. A resource partition aggregating method, executed on a base station, the method comprising:
   acquiring a resource utilization ratio of each resource partition in a first signal unit;
   determining whether there is a resource utilization ratio of each resource partition of at least two adjacent resource partitions in the first signal unit is less than a first preset threshold;
   when there is a resource utilization ratio of each resource partition of at least two adjacent resource partitions in the first signal unit is less than a first preset threshold, determining whether a zone index used after aggregating the at least two adjacent resource partitions causes a communication interference with zone indexes used by resource partitions in an adjacent second signal unit;
   when no communication interference is caused, determining area distribution parameters of the aggregated at least two adjacent resource partitions; and
   sending a broadcast message carrying the area distribution parameters to a vehicle terminal, the broadcast message being used to instruct the vehicle terminal to determine a zone index of a resource partition in which the vehicle terminal is located and to use a resource pool corresponding to the zone index, according to the area distribution parameters and a pre-acquired geographic location.

2. The resource partition aggregating method of claim 1, before determining the area distribution parameters of the aggregated at least two adjacent resource partitions, further comprising:
   determining whether a resource utilization ratio of a new resource partition acquired by aggregating the at least two adjacent resource partitions is greater than a second preset threshold;
   when the resource utilization ratio of the new resource partition is not greater than the second preset threshold, determining the area distribution parameters of the aggregated at least two adjacent resource partitions.

3. The resource partition aggregating method of claim 2, when the resource utilization ratio of the new resource partition is greater than the second preset threshold, further comprising:
   not aggregating the at least two adjacent resource partitions.

4. The resource partition aggregating method of claim 1, wherein, determining whether a zone index used after aggregating the at least two adjacent resource partitions causes a communication interference with zone indexes used by resource partitions in an adjacent second signal unit comprises:
   determining whether each resource partition of the at least two resource partitions is close to a boundary between the first signal unit and the second signal unit;
   when each resource partition of the at least two resource partitions is not close to the boundary, determining that the zone index used after aggregating the at least two adjacent resource partitions does not cause any communication interference with the zone indexes used by the resource partitions in the second signal unit.

5. The resource partition aggregating method of claim 1, wherein determining whether a zone index used after aggregating the at least two adjacent resource partitions causes a communication interference with zone indexes used by resource partitions in an adjacent second signal unit comprises:
   determining whether each resource partition of the at least two resource partitions is close to a boundary between the first signal unit and the second signal unit;
   when each resource partition of the at least two resource partitions is close to the boundary, sending the zone index of each resource partition of the at least two adjacent resource partitions to a base station that the second signal unit belongs to, to enable the base station to determine whether zone indexes used by the resource partitions close to the boundary in the second signal unit are the same as the zone index of each resource partition of the at least two adjacent resource partitions, and return aggregation indication information;
   according to the aggregation indication information, determining whether a zone index used after aggregating the at least two adjacent resource partitions causes a communication interference with zone indexes used by resource partitions in an adjacent second signal unit.

6. The resource partition aggregating method of claim 5, wherein the aggregation indication information comprises a zone index used by a new resource partition acquired by aggregating the resource partitions close to the boundary in the second signal unit is the same as a zone index used by a target resource partition of the at least two adjacent resource partitions; and the method further comprising:

according to the aggregation indication information, determining whether a zone index used after aggregating the at least two adjacent resource partitions causes a communication interference with zone indexes used by resource partitions in an adjacent second signal unit comprises:

removing the zone index used by the target resource partition of the at least two adjacent resource partitions, to determine that the zone index used after aggregating the at least two adjacent resource partitions does not cause any communication interference with the zone indexes used by the resource partitions in the second signal unit.

7. The resource partition aggregating method of claim 5, wherein the aggregation indication information comprises the resource partitions close to the boundary in the second signal unit not being aggregated; and the method further comprising:

according to the aggregation indication information, determining whether a zone index used after aggregating the at least two adjacent resource partitions causes a communication interference with zone indexes used by resource partitions in an adjacent second signal unit comprises:

when the resource partitions close to the boundary in the second signal unit are not aggregated, determining that the zone index used after aggregating the at least two adjacent resource partitions does not cause any communication interference with the zone indexes used by the resource partitions in the second signal unit.

8. The resource partition aggregating method of claim 5, wherein the aggregation indication information comprises the zone index used by the new resource partition acquired by aggregating the resource partitions close to the boundary in the second signal unit being different from the zone index used by each resource partition of the at least two adjacent resource partitions; and the method further comprising:

according to the aggregation indication information, determining whether a zone index used after aggregating the at least two adjacent resource partitions causes a communication interference with zone indexes used by resource partitions in an adjacent second signal unit comprises:

when the zone index used by the new resource partition acquired by aggregating resource partitions close to the boundary in the second signal unit is different from the zone index used by each resource partition of the at least two adjacent resource partitions, determining that the zone index used after aggregating the at least two adjacent resource partitions does not cause any communication interference with the zone indexes used by the resource partitions in the second signal unit.

9. The resource partition aggregating method of claim 1, wherein the first signal unit covered by the base station is divided into a plurality of resource partitions, and the plurality of resource partitions are identified using different zone indexes.

10. The resource partition aggregating method of claim 1, if there is no resource utilization ratio of each resource partition of at least two adjacent resource partitions in the first signal unit is less than the first preset threshold, further comprising:

not aggregating the resource partitions in the first signal unit.

11. The resource partition aggregating method of claim 1, wherein sending a broadcast message carrying the area distribution parameters to a vehicle terminal comprises:

when the vehicle terminal is in a new resource partition acquired by aggregating the at least two adjacent resource partitions, sending the broadcast message carrying the area distribution parameters of the new resource partition acquired by aggregating the at least two adjacent resource partitions to the vehicle terminal;

when the vehicle terminal is in another resource partition that is not aggregated, sending a broadcast message carrying area distribution parameters of a resource partition that is not aggregated, to the vehicle terminal.

12. The resource partition aggregating method of claim 1, wherein the area distribution parameters comprises a hash function required to calculate the zone index and calculation parameters in the hash function.

13. A resource partition aggregating device, the device comprising:

at least one processor; and a storage device storing a plurality of instructions, which when executed by the at least one processor, causes the at least one processor to:

acquire a resource utilization ratio of each resource partition in a first signal unit;

determine whether there is a resource utilization ratio of each resource partition of at least two adjacent resource partitions in the first signal unit is less than a first preset threshold;

when there is a resource utilization ratio of each resource partition of at least two adjacent resource partitions in the first signal unit is less than a first preset threshold, determine whether a zone index used after aggregating the at least two adjacent resource partitions causes a communication interference with zone indexes used by resource partitions in an adjacent second signal unit;

when no communication interference is caused, determine area distribution parameters of the aggregated at least two adjacent resource partitions; and send a broadcast message carrying the area distribution parameters to a vehicle terminal, the broadcast message being used to instruct the vehicle terminal to determine a zone index of a resource partition in which the vehicle terminal is located and to use a resource pool corresponding to the zone index, according to the area distribution parameters and a pre-acquired geographic location.

14. The resource partition aggregating device of claim 13, wherein, the plurality of instructions, when executed by the at least one processor, further causes the at least one processor to:

determine whether a resource utilization ratio of a new resource partition acquired by aggregating the at least two adjacent resource partitions is greater than a second preset threshold; when the resource utilization ratio of the new resource partition is not greater than the second preset threshold, determine the area distribution parameters of the aggregated at least two adjacent resource partitions is executed.

15. The resource partition aggregating device of claim 13, wherein the plurality of instructions, when executed by the at least one processor, further causes the at least one processor to:

determine whether each resource partition of the at least two resource partitions is close to a boundary between the first signal unit and the second signal unit;

when each resource partition of the at least two resource partitions is not close to the boundary, determine that the zone index used after aggregating the at least two adjacent resource partitions does not cause any communication interference with the zone indexes used by the resource partitions in the second signal unit.

16. The resource partition aggregating device of claim 13, wherein the plurality of instructions, when executed by the at least one processor, further causes the at least one processor to:
   determine whether each resource partition of the at least two resource partitions is close to a boundary between the first signal unit and the second signal unit;
   when each resource partition of the at least two resource partitions is close to the boundary, send the zone index of each resource partition of the at least two adjacent resource partitions to a base station that the second signal unit belongs to, to enable the base station to determine whether zone indexes used by the resource partitions close to the boundary in the second signal unit are the same as the zone index of each resource partition of the at least two adjacent resource partitions, and return aggregation indication information;
   according to the aggregation indication information, determining whether a zone index used after aggregating the at least two adjacent resource partitions causes a communication interference with zone indexes used by resource partitions in an adjacent second signal unit.

17. The resource partition aggregating device of claim 16, wherein the aggregation indication information comprises a zone index used by a new resource partition acquired by aggregating the resource partitions close to the boundary in the second signal unit being aggregated is the same as a zone index used by a target resource partition of the at least two adjacent resource partitions;
   the plurality of instructions, when executed by the at least one processor, further causes the at least one processor to:
   remove the zone index used by the target resource partition of the at least two adjacent resource partitions, to determine that the zone index used after aggregating the at least two adjacent resource partitions does not cause any communication interference with the zone indexes used by the resource partitions in the second signal unit.

18. The resource partition aggregating device of claim 16, wherein the aggregation indication information comprises the resource partitions close to the boundary in the second signal unit not being aggregated;
   the plurality of instructions, when executed by the at least one processor, further causes the at least one processor to:
   when the resource partitions close to the boundary in the second signal unit are not aggregated, determine that the zone index used after aggregating the at least two adjacent resource partitions does not cause any communication interference with the zone indexes used by the resource partitions in the second signal unit.

19. The resource partition aggregating device of claim 16, wherein the aggregation indication information comprises the zone index used by the new resource partition acquired by aggregating the resource partitions close to the boundary in the second signal unit being different from the zone index used by each resource partition of the at least two adjacent resource partitions;
   the plurality of instructions, when executed by the at least one processor, further causes the at least one processor to:
   when the zone index used by the new resource partition acquired by aggregating resource partitions close to the boundary in the second signal unit is different from the zone index used by each resource partition of the at least two adjacent resource partitions, determine that the zone index used after aggregating the at least two adjacent resource partitions does not cause any communication interference with the zone indexes used by the resource partitions in the second signal unit.

20. A non-transitory storage medium having stored thereon a plurality of instructions that, when executed by at least one processor of a terminal, causes the processor to perform an application freezing management method using the terminal, the method comprising:
   acquiring a resource utilization ratio of each resource partition in a first signal unit;
   determining whether there is a resource utilization ratio of each resource partition of at least two adjacent resource partitions in the first signal unit is less than a first preset threshold;
   when there is a resource utilization ratio of each resource partition of at least two adjacent resource partitions in the first signal unit is less than a first preset threshold, determining whether a zone index used after aggregating the at least two adjacent resource partitions causes a communication interference with zone indexes used by resource partitions in an adjacent second signal unit;
   when no communication interference is caused, determining area distribution parameters of the aggregated at least two adjacent resource partitions; and
   sending a broadcast message carrying the area distribution parameters to a vehicle terminal, the broadcast message being used to instruct the vehicle terminal to determine a zone index of a resource partition in which the vehicle terminal is located and to use a resource pool corresponding to the zone index, according to the area distribution parameters and a pre-acquired geographic location.

* * * * *